US010131474B2

(12) United States Patent
Py

(10) Patent No.: US 10,131,474 B2
(45) Date of Patent: *Nov. 20, 2018

(54) APPARATUS AND METHOD FOR SEALING WITH A LIQUID SEALANT

(71) Applicant: Dr. Py Institute LLC, New Milford, CT (US)

(72) Inventor: Daniel Py, Larchmont, NY (US)

(73) Assignee: DR. PY INSTITUTE LLC, New Milford, CT (US)

( * ) Notice: Subject to any disclaimer, the term of this patent is extended or adjusted under 35 U.S.C. 154(b) by 51 days.

This patent is subject to a terminal disclaimer.

(21) Appl. No.: 14/680,393

(22) Filed: Apr. 7, 2015

(65) Prior Publication Data

US 2015/0239623 A1    Aug. 27, 2015

Related U.S. Application Data

(62) Division of application No. 12/901,420, filed on Oct. 8, 2010, now Pat. No. 8,998,034.

(Continued)

(51) Int. Cl.
*B65D 47/20* (2006.01)
*B65B 55/08* (2006.01)
(Continued)

(52) U.S. Cl.
CPC ........ *B65D 47/2081* (2013.01); *B05B 11/047* (2013.01); *B29B 11/08* (2013.01);
(Continued)

(58) Field of Classification Search
CPC ...... F16K 15/147; F16C 13/06; B65B 51/023; B65D 51/002; B29C 73/025
(Continued)

(56) References Cited

U.S. PATENT DOCUMENTS 1,371,578 A * 3/1921 Schopp ................. B65B 31/047
                                                                 141/111
2,732,986 A * 1/1956 Whittington ............ F17C 13/06
                                                                  141/10
(Continued)

FOREIGN PATENT DOCUMENTS

CN       101107176 A     1/2008
CN       100526165 C     8/2009
(Continued)

OTHER PUBLICATIONS

International Search Report and Written Opinion of the International Searching Authority for International Application No. PCT/US2010/052102.

*Primary Examiner* — J. Casimer Jacyna
(74) *Attorney, Agent, or Firm* — McCarter & English, LLP

(57) ABSTRACT

A device includes a first part having a co-molded first support, valve cover and elastic actuator, and a second part having an injection molded second support, valve seat, and variable-volume storage chamber pre-form. The pre-form is blow molded into a flexible pouch defining the variable-volume storage chamber. The one-way valve includes a semi-annular, curvilinear, relatively rigid valve seat defining axially-extending, opposing first marginal portions, and an axially-extending first mid-portion angularly extending between the opposing first marginal portions. A flexible valve member is superimposed on the valve seat and defines axially-extending, opposing second marginal portions fixedly secured on or adjacent to respective first marginal portions of the valve seat, and an axially-extending second mid-portion angularly extending between the opposing first marginal portions and superimposed onto the first mid-portion of the valve seat. The flexible valve cover and valve seat form a normally closed axially and angularly extending valve seam therebetween.

16 Claims, 10 Drawing Sheets

Related U.S. Application Data

(60) Provisional application No. 61/250,363, filed on Oct. 9, 2009.

(51) Int. Cl.

| | | |
|---|---|---|
| *B65D 51/00* | (2006.01) | |
| *B65B 51/02* | (2006.01) | |
| *B29B 11/08* | (2006.01) | |
| *B65D 83/00* | (2006.01) | |
| *F16K 15/14* | (2006.01) | |
| *B05B 11/04* | (2006.01) | |
| *B29C 73/02* | (2006.01) | |
| *B29B 11/14* | (2006.01) | |
| *B29C 49/06* | (2006.01) | |
| *B29K 23/00* | (2006.01) | |
| *B29K 67/00* | (2006.01) | |
| *B29K 105/00* | (2006.01) | |

(52) U.S. Cl.
CPC ............ *B65B 51/023* (2013.01); *B65B 55/08* (2013.01); *B65D 51/002* (2013.01); *B65D 83/0061* (2013.01); *F16K 15/147* (2013.01); *B29B 11/14* (2013.01); *B29B 2911/1402* (2013.01); *B29B 2911/1404* (2013.01); *B29B 2911/1408* (2013.01); *B29B 2911/1414* (2013.01); *B29B 2911/14026* (2013.01); *B29B 2911/14033* (2013.01); *B29B 2911/1442* (2013.01); *B29B 2911/1452* (2013.01); *B29B 2911/14053* (2013.01); *B29B 2911/14066* (2013.01); *B29B 2911/14093* (2013.01); *B29B 2911/14106* (2013.01); *B29B 2911/14113* (2013.01); *B29B 2911/14133* (2013.01); *B29B 2911/14326* (2013.01); *B29B 2911/14333* (2013.01); *B29B 2911/14473* (2013.01); *B29C 49/06* (2013.01); *B29C 73/025* (2013.01); *B29K 2023/12* (2013.01); *B29K 2067/00* (2013.01); *B29K 2105/258* (2013.01); *Y10T 137/7837* (2015.04)

(58) Field of Classification Search
USPC ....................................................... 141/2, 329
See application file for complete search history.

(56) References Cited

U.S. PATENT DOCUMENTS

| | | | |
|---|---|---|---|
| 2,926,705 A * | 3/1960 | Dorn | B67C 3/26 |
| | | | 141/105 |
| 3,247,640 A * | 4/1966 | De Wayne Miles | |
| | | | B65B 31/003 |
| | | | 222/387 |
| 3,329,295 A | 7/1967 | Fields | |
| 3,637,102 A | 1/1972 | Shaw | |
| 3,653,934 A * | 4/1972 | Rolle | A61J 3/077 |
| | | | 106/153.1 |
| 3,784,039 A | 1/1974 | Marco | |
| 4,039,106 A | 8/1977 | Juillet | |
| 4,231,211 A * | 11/1980 | Strampfer | A61J 3/071 |
| | | | 141/329 |
| 4,313,289 A * | 2/1982 | Birdsong, Jr. | A63B 39/04 |
| | | | 53/79 |
| 4,444,330 A * | 4/1984 | Kasai | B01L 3/50825 |
| | | | 215/247 |
| 4,652,624 A | 3/1987 | Allen et al. | |
| 5,226,568 A | 7/1993 | Newton et al. | |
| 5,613,517 A | 3/1997 | Handler | |
| 5,641,004 A * | 6/1997 | Py | B65B 3/003 |
| | | | 141/10 |
| 5,769,125 A | 6/1998 | Duer et al. | |
| 6,056,622 A * | 5/2000 | Chung | A63B 43/04 |
| | | | 446/435 |
| 6,079,449 A | 6/2000 | Gerber | |
| 6,467,653 B1 | 10/2002 | Hamamoto et al. | |
| 6,684,916 B2 * | 2/2004 | Py | A61J 1/18 |
| | | | 141/2 |
| 7,357,335 B2 | 4/2008 | Laidler et al. | |
| 7,365,343 B2 * | 4/2008 | Thilly | A61L 2/0011 |
| | | | 141/11 |
| 7,992,597 B2 * | 8/2011 | Py | A61J 1/1406 |
| | | | 141/11 |
| 8,998,034 B2 | 4/2015 | Py | |
| 2002/0023409 A1 * | 2/2002 | Py | A61J 1/18 |
| | | | 53/426 |
| 2004/0222224 A1 | 11/2004 | Plester | |
| 2005/0147525 A1 | 7/2005 | Bousquet | |
| 2006/0037884 A1 | 2/2006 | Doyle et al. | |
| 2006/0065677 A1 | 3/2006 | Py et al. | |
| 2007/0151984 A1 | 7/2007 | Baker et al. | |
| 2007/0194045 A1 | 8/2007 | Py et al. | |
| 2008/0116226 A1 | 5/2008 | Py et al. | |
| 2008/0118299 A1 | 5/2008 | Py et al. | |
| 2009/0302064 A1 | 12/2009 | Lavabre | |
| 2009/0306595 A1 * | 12/2009 | Shih | A61M 5/14276 |
| | | | 604/151 |
| 2010/0005760 A1 | 1/2010 | Matheyka | |
| 2010/0133295 A1 | 6/2010 | Chan et al. | |
| 2010/0211020 A1 | 8/2010 | Layton, Jr. | |
| 2010/0221155 A1 | 9/2010 | Shimizu et al. | |

FOREIGN PATENT DOCUMENTS

| | | |
|---|---|---|
| DE | 1209825 B | 1/1966 |
| EP | 0 302 575 A1 | 2/1989 |
| GB | 2153048 A | 8/1985 |
| JP | S61115853 | 6/1986 |
| WO | 97/36785 A1 | 10/1997 |
| WO | 2008134808 A1 | 11/2008 |

\* cited by examiner

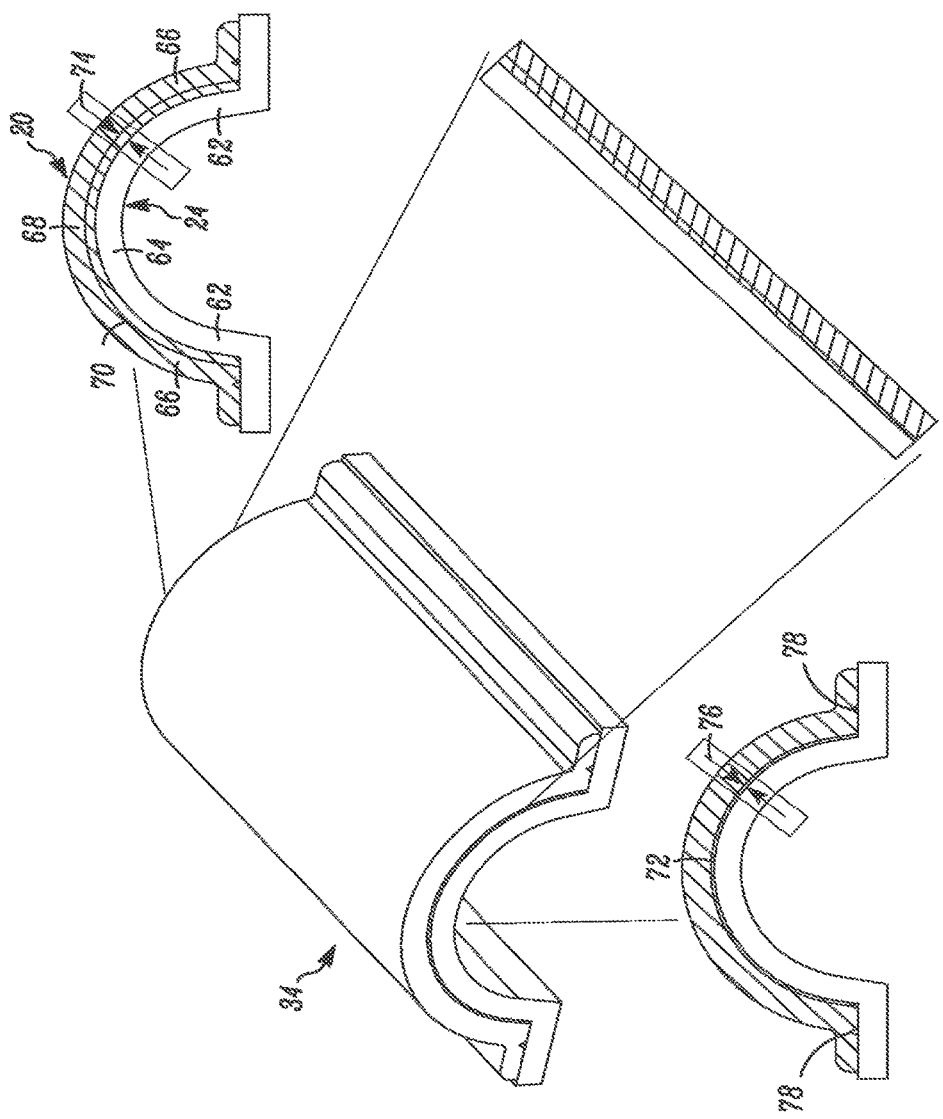

APPARATUS AND METHOD FOR SEALING WITH A LIQUID SEALANT

CROSS-REFERENCE TO RELATED APPLICATIONS

This patent application is a divisional of U.S. patent application Ser. No. 12/901,420, entitled "Device with Co-Molded Closure, One-Way Valve and Variable-Volume Storage Chamber, and Related Method," now U.S. Pat. No. 8,998,034, which claims the benefit of similarly-titled U.S. Provisional Patent Application Ser. No. 61/250,363, filed Oct. 9, 2009, all of which are hereby expressly incorporated by reference as part of the present disclosure.

FIELD OF THE INVENTION

The present invention relates to devices with one-way valves and variable-volume storage chambers, and more particularly, to new and improved one-way valves, devices including one-way valves and/or variable-volume storage chambers, and to related methods.

BACKGROUND INFORMATION

Prior art devices including one-way valves and variable-volume storage chambers require the separate manufacture of the one-way valves, the closures, the variable-volume storage chambers, and the housings for receiving therein one or more such components. Such prior art devices require the separate manufacture and assembly of multiple components, and in some instances, require sterilization of such multiple components prior to assembly. Such devices can be relatively expensive, and their manufacture relatively time consuming and expensive.

Accordingly, it is an object of the present invention to overcome one or more of the above-described drawbacks and/or disadvantages of the prior art.

SUMMARY OF THE INVENTION

In accordance with a first aspect, the present invention is directed to a one way valve comprising a semi-annular, relatively rigid valve seat defining axially-extending, opposing first marginal portions, and an axially-extending first mid-portion angularly extending between the opposing first marginal portions. A flexible valve member is superimposed on the valve seat and defines axially-extending, opposing second marginal portions fixedly secured on or adjacent to respective first marginal portions of the valve seat, and an axially-extending second mid-portion angularly extending between the opposing first marginal portions and superimposed onto the first mid-portion of the valve seat. The flexible valve cover and valve seat form a normally closed axially and angularly extending valve seam therebetween. The valve seam defines an inlet at approximately one end thereof, and an outlet axially spaced relative to the inlet at approximately another end thereof. The valve cover and valve seat define a first degree of interference therebetween at the inlet, and a second degree of interference therebetween at the outlet that is less than the first degree of interference. The valve cover is movable in response to fluid at the inlet exceeding a valve opening pressure between (i) a normally closed position with the first and second mid-portions in contact with each other and defining the normally closed seam, and (ii) a second position with at least a portion of the valve cover spaced away from the valve seat to allow the fluid to pass through the seam from the inlet through the outlet.

In some embodiments of the present invention, the degree of interference between the valve cover and valve seat progressively decreases from the first degree of interference to the second degree of interference. In some such embodiments, the degree of interference substantially uniformly decreases from the first degree of interference to the second degree of interference. In some embodiments, the degree of interference between the valve cover and the valve seat is higher at the marginal portions of the valve cover than at the mid-portions of the valve cover.

In some embodiments of the present invention, in the normally closed position, the valve cover and valve seat form a hermetic seal therebetween. In some such embodiments, in the normally closed position, the hermetic seal substantially prevents the ingress of bacteria or germs in the direction from the outlet to the inlet. In some embodiments, the valve seat is curvilinear, such as semi-circular.

In accordance with another aspect, the present invention is directed to a flexible valve cover formed of material with elastic properties and substantially zero creep. In some such embodiments, the material is a silicone. In some embodiments, the elastic material includes an antimicrobial additive. In some such embodiments, the elastic material is a relatively low durometer silicone including a silver-based antimicrobial additive.

In some embodiments of the present invention, the valve cover defines a substantially uniform thickness substantially throughout the mid-portion thereof. In some embodiments, the valve cover defines a substantially uniform thickness substantially throughout the marginal portions thereof. In some such embodiments, the valve cover defines a substantially uniform thickness substantially throughout the mid-portion and marginal portions thereof. In some embodiments, the mid-portion of the valve seat is substantially curvilinear, such as semi-circular, and in some such embodiments, the mid-portion and opposing marginal portions of the valve seat are substantially semi-circular. Preferably, the mid-portion of the valve cover is substantially in tension between the opposing marginal portions thereof.

In accordance with another aspect, the present invention is directed to a method comprising the following steps:
  (i) injection molding a support and integral variable-volume storage chamber pre-form; and
  (ii) blow molding the pre-form, but not the support, into an expanded shape forming a flexible pouch defining the variable-volume storage chamber.

In some embodiments of the present invention, the method further comprises the following steps:
  (i) collapsing the flexible pouch and variable-volume storage chamber formed within the pouch;
  (ii) sealing the interior of the variable-volume storage chamber with respect to ambient atmosphere; and
  (iii) sterilizing the sealed variable-volume storage chamber.

The currently preferred embodiments of the present invention further comprise the steps of molding a closure, and assembling the molded closure to the support to seal the variable-volume storage chamber with the closure. In some such embodiments, the step of molding the closure includes co-molding a support and integral flexible valve cover, wherein the flexible valve cover is preferably a liquid silicone that is over-molded; the step of injection molding a preferably rigid support includes injection molding the support and integral valve seat; and the step of assembling the closure to the support includes superimposing the valve cover on the valve seat and forming an axially-extending, normally closed valve seam there between. In the currently preferred embodiments, the closure is snapped onto the support, and the closure defines in a single piece, a peripheral rigid snapping ring and a central elastic member. The central elastic member is preferably a silicone member that has at least two portions: (i) a valve portion which extends as a bridge across the space left open in the center by the surrounding rigid snapping ring, and (ii) a depressible dome portion forming an actuator that may be manually or otherwise engageable for actuating the device and dispensing multiple doses through the valve. The configuration of the central elastic member is such that after assembly of the closure or first support onto the second support, the valve portion forms an interference fit with the nozzle segment of the pre-form, and the dome is located above a rigid compression chamber segment of the pre-form. The bottom of the compression chamber is open in continuity with the inner channel of a hollow finger like portion of the pre-form for blow molding into the flexible pouch.

In some embodiments, the step of molding the closure further includes co-molding a flexible actuator, which is preferably the dome-shaped actuator described above, integral with the flexible valve cover, and the step of assembling the closure to the support further includes forming the compression chamber between the actuator and support that is connectible in fluid communication between the variable-volume storage chamber and the valve seam.

In some embodiments of the present invention, the step of molding the closure includes co-molding an integral support and penetrable portion, and the assembling step includes assembling the closure to the support with the penetrable portion in fluid communication with the variable-volume storage chamber. Some such embodiments further comprise the steps of introducing an injection member, such as a needle, through the penetrable portion after a pre-filling sterilizing step, introducing a substance through the injection member and into the variable-volume storage chamber, withdrawing the injection member from the penetrable portion, and resealing a resulting penetration aperture formed in the penetrable portion. In some such embodiments, the resealing step includes applying a liquid sealant to the resulting penetration aperture and hermetically resealing the penetrable portion with the liquid sealant. In some such embodiments, the liquid sealant is applied at approximately ambient temperature. In some such embodiments, the liquid sealant is a silicone and/or includes an anti-microbial additive and/or is loaded with metallic or other detectable particles.

In some embodiments of the present invention, the sterilizing step includes irradiating the sealed, empty variable-volume storage chamber to sterilize the chamber. Some embodiments further comprise assembling the sealed closure and collapsed pouch assembly into a relatively rigid hollow body receiving the empty collapsed pouch therein. Preferably, the sealed closure and collapsed pouch assembly is sterilized prior to assembling same into the hollow body. In some embodiments of the present invention, the collapsing step includes evacuating the pouch. The method further comprises sterile filling the collapsed pouch received within the hollow body. The method preferably further comprises substantially preventing the formation of foam within the pouch during sterile filling thereof, such as by filling an evacuated or substantially evacuated variable-volume storage chamber.

Some embodiments of the present invention further comprise the steps of applying to a surface of the closure and pouch assembly a fluid sterilant, and applying filtered gas at a temperature higher than ambient temperature to the fluid sterilant receiving surface to further evaporate any fluid sterilant thereon. In some such embodiments, the fluid sterilant is applied to a penetrable portion of the closure, and the method further comprises the steps of introducing an injection member through the penetrable portion after application of fluid sterilant and/or filtered gas thereto, introducing a substance through the injection member and into the variable-volume storage chamber, withdrawing the injection member from the penetrable portion, and resealing a resulting penetration aperture formed in the penetrable portion. In some such embodiments, the resealing step includes metering a liquid sealant onto the resulting penetration aperture and hermetically resealing the penetrable portion with the liquid sealant. Some such embodiments further comprise the step of forming the penetrable portion within a recess, and metering the liquid sealant into the recess to reseal the penetration aperture.

In accordance with another aspect, the present invention is directed to a device including a one-way valve, a first support forming the valve seat of the one-way valve thereon, and a variable-volume storage chamber extending outwardly from the first support and connectible in fluid communication with the inlet to the valve seam. In some embodiments of the present invention, the first support at least partially defines a compression chamber connectible in fluid communication between the variable-volume storage chamber and the inlet to the valve seam.

In accordance with another aspect of the present invention, the first support is defined by an injection molded pre-form, and the variable-volume storage chamber is defined by a flexible pouch blow molded from the injection molded pre-form. Some embodiments of the present invention further include a relatively rigid outer hollow recipient. The flexible pouch, which is preferably stretched blow molded from the pre-form, is received within the hollow outer body, and the first support is fixedly secured to the body. Some embodiments of the present invention further comprise a closure including a second support formed integral with the valve cover and fixedly connectible to the first support with the valve cover superimposed on the valve seat. In some embodiments, the first support at least partially defines a compression chamber connectible in fluid communication between the variable-volume storage chamber and the inlet to the valve seam, and the second support includes an actuator movable between first and second positions for pressurizing fluid within the compression chamber above the valve opening pressure to, in turn, dispense the fluid through the one-way valve.

In some embodiments of the present invention, the actuator is a flexible member formed integral with the valve cover. In some such embodiments, the valve cover and flexible actuator are co-molded with the second support. In some such embodiments, the actuator is substantially dome-shaped. In some embodiments, the substantially dome-shaped actuator defines a manually-engageable surface that is manually engageable and movable between the first and second positions. In some embodiments of the present invention, the closure defines a peripheral sealing member formed integral with the flexible valve member and actuator and forming a dry compression seal between the closure and first support. The first and second supports are sealed together, and are preferably snapped together to form a sealed enclosure. The sub-assembly of the first and second supports forms itself essentially the whole liquid container, which may be sterilized after assembly. One of the advantages of this sub-assembly, is that it is formed of only two parts forming a fluid-tight seal therebetween, and is further characterized by a collapsible pouch, which is collapsed, preferably by vacuum, in order to reduce to a minimum the volume to be sterilized. It is particularly advantageous when such sterilization is achieved by radiation. Another advantage of the enclosure sub-assembly, is that it may include a clear transparent base, injection molded in one piece with the pre-form, which allows the use of high energy light for sterilization of the whole enclosure, such as a pulsed UV sterilizing radiation.

Some embodiments of the present invention further comprise a penetrable portion configured to receive therethrough an injection member for sterile filling the variable-volume storage chamber with a substance. The substance may take the form of any of numerous different substances that are currently known or that later become known, such as sterile foods or beverages, including without limitation milks, milk-based products and liquid nutrition products, pharmaceuticals, ophthalmic products, dermatological products, including creams, gels or other liquids of any desired viscosity, and nutritional supplements. Some such embodiments further comprise a sealant overlying a resulting penetration aperture formed in the penetrable portion after removal of the injection member therefrom that hermetically seals the penetration aperture. In some such embodiments, the sealant is a liquid silicone. In some such embodiments, the liquid silicone is room temperature curing. The liquid silicone or other sealant is preferably identical or substantially the same as a liquid silicone or other elastic material, that preferably exhibits substantially zero creep, that is over molded on a relatively rigid snapping ring of the first support. One or more drops of the same liquid silicone or other sealant used to seal the pin hole or other penetration aperture resulting from a piercing member for sterile filling, is preferably blended with one or several of the following elements: (i) an antimicrobial additive, (ii) a colorant for visual inspection and quality control, and/or (iii) a metal or other detectable particles or substances loaded into the liquid silicone for in-line magnetic or other automated sensor detection of the amount of such particles or other detectable substance, and thus the amount of liquid silicone applied to reseal the penetration aperture. The liquid silicone or other sealant may be applied and received within a recess molded in an actuation dome or other surface of the device that defines the penetration region for sterile filling therethrough.

One advantage of the device and method of the present invention, and/or of the currently preferred embodiments thereof, is that the closure, valve cover and actuator can be co-molded as a single part, the base defining the valve seat, compression chamber and variable-volume storage chamber pre-form can be injection molded as a single part, and therefore the device can be formed in essentially two parts that can be easily assembled, such as by snap fitting the closure to the base. Accordingly, the device can be manufactured with significantly fewer parts than prior art devices, yet can exhibit comparable or even greater functionality than such prior art devices.

Another advantage of the preferred embodiments is that the device and method allow the capacity to fill viscous products and to re-seal at room temperature, even over a residue, due to the cavity being made for the purpose of sealing, and being made of the same material or substantially the same material as the sealant.

Another advantage of the currently preferred embodiments is the self resealing property of the elastic and the relatively thick silicone dome actuator which prevents any ingress after filling. As a result, the sterile filling machine used to fill the device may be relatively inexpensive, whether it includes a laser for resealing, and/or involves the assembly of an additional part for mechanically resealing the resulting penetration aperture.

Another substantial advantage of the preferred embodiments is that the valve is extremely simple, and the tension only of the elastic valve segment after assembly onto the second support allows the valve characteristics to be adjusted to the viscosity of the product to be sealed within the device and dispensed through the valve. Any residue left in between the valve and the underlying nozzle is forced out by the interference/hoop stress differential between the valve and nozzle from the base to the dispensing tip of the valve.

Another advantage of the currently preferred embodiments is that the elastic valve member is easy to assemble onto the rigid underlying nozzle of the enclosure and thereby provides a high quality product at a relatively inexpensive cost.

Another substantial advantage of the preferred embodiments is the possibilities offered by the relatively thin wall of the stretched blow molded pouch, and as a consequence, the extremely small amount of plastic needed to form the liquid container itself, which may be made of only two pieces. Yet another advantage is that the outer housing or recipient can be made out of a fully bio degradable material, of a re-usable material and/or an entirely recyclable material, knowing that the enclosure can be disassembled automatically from the outer recipient.

Other objects and advantages of the present invention, and/or of the currently preferred embodiments thereof, will become more readily apparent in view of the following detailed description of the currently preferred embodiments and accompanying drawings.

BRIEF DESCRIPTION OF THE DRAWINGS

FIG. 10 illustrates partial, cross-sectional views of the one-way valve of the devices of FIGS. 1-9.

DETAILED DESCRIPTION OF CURRENTLY PREFERRED EMBODIMENTS OF THE PRESENT INVENTION

Figure 1:
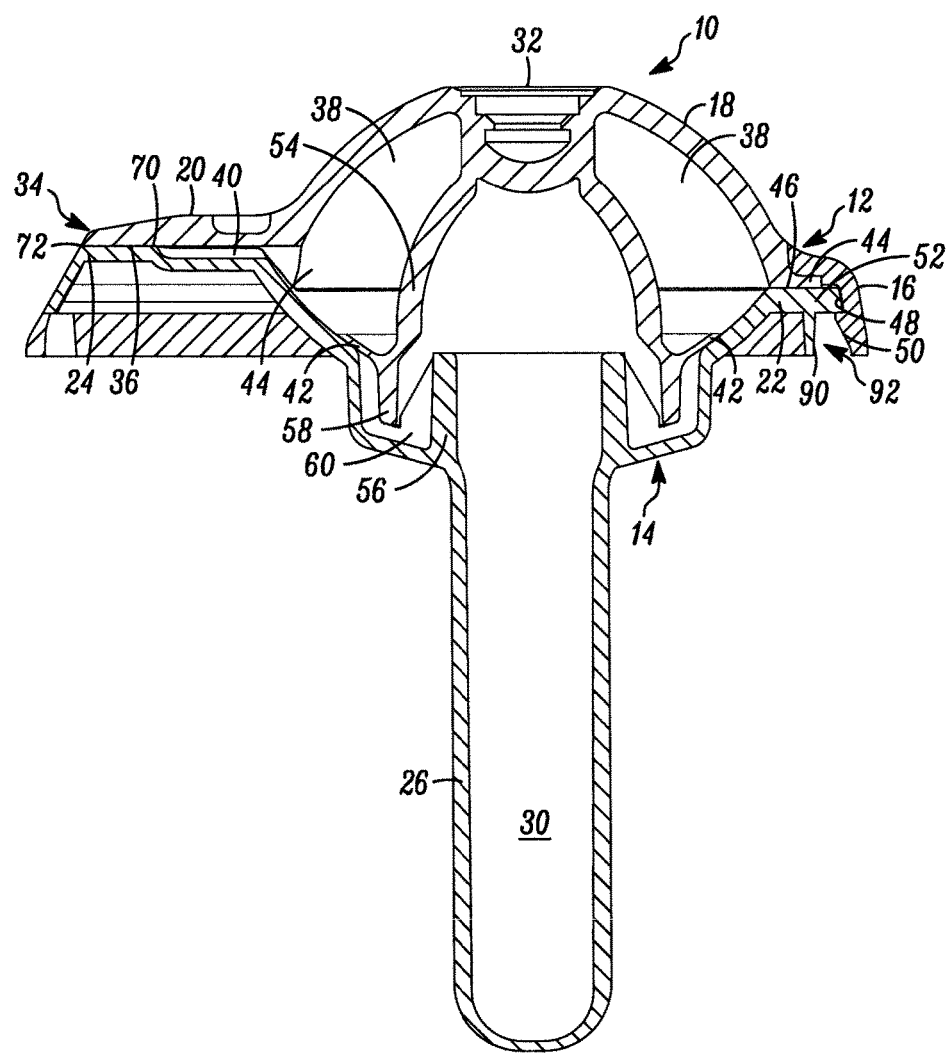
FIG. 1 is a cross-sectional view of an assembled closure including a co-molded one-way valve, dome-spring actuator and support that is fixedly connected to an injection molded base including a valve seat and variable-volume storage chamber pre-form.

In FIGS. 1-10, a device embodying the present invention is indicated generally by the reference numeral 10. The device 10 includes a first piece 12 that is secured to a second piece 14 to form a sealed, empty device. The first piece 12 defines an integral first support 16, actuator 18 and flexible one-way valve or valve cover 20. The components of the first piece 12 are co-molded, such as by injection molding the first support 16, and over molding the actuator 18 and valve cover 20 to the first support 16. The second piece 14 includes a second support 22, a valve seat or nozzle 24, and a variable-volume storage chamber pre-form 26. As described further below in connection with FIG. 2, the pre-form 26, but not the second support 22 and valve seat 24, is blow molded into a flexible pouch defining a variable-volume storage chamber 30.

The first piece 12 further defines a recess 32, which as described further below in connection with FIGS. 7 and 8, defines a needle penetrable region that is penetrable by a needle or other injection member to sterile or aseptically fill the variable-volume storage chamber 30. The recess 32 is adapted to receive a substantially metered amount of a liquid sealant, such as a silicone sealant, to hermetically seal the resulting needle penetration aperture and thereby hermetically seal the sterile filled substance within the variable-volume storage chamber 30.

As described further below, the flexible valve cover 20 and relatively rigid valve seat 24 form a one-way valve 34 defining an axially-elongated, normally closed interface or valve seam 36 therebetween. The first piece 12 and second piece 14 cooperate to define a compression chamber 38 that is connectible in fluid communication between the variable-volume storage chamber 30 and an inlet 40 to the normally closed valve seam 36 of the one-way valve 34. An annular check valve 42 is co-molded with the valve cover and actuator, and formed between the variable-volume storage chamber 30 and the compression chamber 38. As described further below, movement of the actuator 18 draws substantially metered amounts of the substance stored in the variable-volume storage chamber 30 through the check valve 42 and into the compression chamber 38 and, in turn, pressurizes the substance in the compression chamber above a valve opening pressure to dispense the substance through the normally closed valve seam 36 of the one-way valve 34 and out of the device. The first piece 12 further defines a resilient sealing member 44 co-molded with the valve cover, actuator and check valve, and extending about the periphery of the first piece. The second piece 14 defines a peripheral sealing surface 46 that engages the resilient sealing member 44 to form a compression seal therebetween to hermetically seal the interior of the device with respect to ambient atmosphere. The first support 16 defines on an interior surface thereof an annular groove 48 and an annular chamfer 50 formed adjacent to the annular groove. The second support 22 defines an annular flange 52 that is received within the annular recess 48 of the first support to fixedly secure the two supports together. The annular chamfer 50 facilitates movement of the second support 22 into the first support 16 and, in turn, snap fitting the peripheral flange 52 into the recess 48. Upon receiving the flange 52 into the recess 48, the sealing surface 46 compressively engages the sealing member 44 to form a dry, compression seal.

In the illustrated embodiment, the actuator 18 is substantially dome-shaped, and is formed of a resilient and/or elastomeric material. The dome-shaped actuator 18 defines a substantially dome-shaped spring that allows the actuator to be depressed inwardly to compress the compression chamber 38 and, in turn, dispense substantially metered volumes of substance through the one-way valve 34. A second substantially dome-shaped spring 54 is formed integral with the actuator, and is spaced axially and radially inwardly from the interior surface of the actuator 18 to define the compression chamber 38 therebetween. As can be seen, the spring 54 defines a curvilinear, substantially dome-shaped wall providing the spring with a substantial dome shape. The second piece 22 defines a boss 56 forming the inlet and outlet of the variable-volume storage chamber 30. The spring 54 defines an annular base 58 that is axially and radially spaced relative to the boss 56 to form an annular fluid-flow path therebetween. The second support 22 defines an annular recess 60 that receives therein the annular base 58 of the spring 54. The annular recess 60 defines an annular fluid flow path between the variable-volume storage chamber 30 and the one-way check valve 42.

In order to actuate the device 10, the actuator 18 is depressed inwardly to compress the substance within the compression chamber 38 above the valve opening pressure. As the actuator 18 is depressed inwardly, the annular base 58 of the spring 54 is moved axially inwardly, and radially outwardly within the annular recess 60 of the second support 22. This forces the resilient annular check valve 42 radially outwardly against the annular sealing surface of the second support 22 to thereby maintain the check valve in the closed or sealed position, and in turn allow pressurization of the substance within the compression chamber above the valve opening pressure. The annular recess 60 also operates to stop further axial and radial movement of the base 58 with further inward movement of the actuator 18 to thereby progressively decrease the volume of the compression chamber 38 as the actuator 18 is further depressed. When the substance within the compression chamber 38 exceeds the valve opening pressure, the substance is forced through the inlet 40 and normally closed seam 36 of the one-way valve 34 and out of the device. Then, the actuator 18 is released which, in turn, allows the dome-spring of the actuator 18 and dome spring 54 to drive the actuator outwardly and into its ambient or rest position, as shown typically in FIG. 1. During movement from the depressed position to the rest or ambient position, the compression chamber 38 is expanded which, in turn, draws a substantially metered amount of substance from the variable-volume storage chamber 30, through the annular recess 60 and check valve 42, and into the compression chamber 38. The device 10 is then ready to dispense another metered amount of substance by repeating the foregoing steps. The actuator 18 may be manually engaged and depressed by a using the finger(s) of the same hand that is holding the device, or the device may be mounted within an apparatus known to those of ordinary skill in the pertinent art that includes an actuating device that engages the actuator 18 to depress the actuator.

As shown best in FIG. 10, the one way valve 34 comprises a semi-annular, relatively rigid valve seat 24 defining axially-extending, opposing first marginal portions 62, and an axially-extending first mid-portion 64 angularly extending between the opposing first marginal portions 62. The flexible valve member 20 is superimposed on the valve seat 24 and defines axially-extending, opposing second marginal portions 66 that are fixedly secured on or adjacent to the respective first marginal portions 62 of the valve seat 24. The valve cover 20 further defines an axially-extending second mid-portion 68 angularly extending between the opposing first marginal portions 66 and superimposed onto the first mid-portion 64 of the valve seat 24. In the illustrated embodiment, the mid-portions 64, 68 are curvilinear, and are substantially semi-circular. However, as may be recognized by those of ordinary skill in the pertinent art based on the teachings herein, the valve seat and valve cover may define any of numerous other curvilinear shapes, any of numerous other combinations of curvilinear and flat shapes, and/or a substantially flat or planar shape. The flexible valve cover 20 and valve seat 24 form the normally closed axially and angularly extending valve seam 36 therebetween. The valve seam 36 defines an inlet 70 at approximately one end thereof, and an outlet 72 axially spaced relative to the inlet at approximately another end thereof. As shown in FIG. 10, the valve cover 20 and valve seat 24 define a first degree of interference 74 therebetween at the inlet 70, and a second degree of interference 76 therebetween at the outlet 72 that is less than the first degree of interference 74. As shown in FIG. 10, the valve cover 20 is movable in response to fluid at the inlet 70 exceeding a valve opening pressure between (i) a normally closed position with the first and second mid-portions 64, 68 in contact with each other and defining the normally closed seam 36, and (ii) a second or open position with at least a portion of the valve cover 20 spaced away from the valve seat 24 to allow the fluid or other substance to pass through the seam 36 from the inlet 70 through the outlet 72. For example, as shown typically in FIG. 10, the pressurized fluid may cause axially spaced segments of the valve cover to sequentially move between the normally closed and open positions while the fluid moves from the inlet through the outlet of the valve.

In the illustrated embodiment, and as indicated by the broken lines in FIG. 10, the degree of interference between the valve cover 20 and valve seat 24 progressively decreases from the first degree of interference 74 to the second degree of interference 76, i.e., the deeper the broken line from the respective interface, the greater the interference. Also in the illustrated embodiment, the degree of interference substantially uniformly decreases from the first degree of interference 74 to the second degree of interference 76. In addition, as also indicated by the broken lines in FIG. 10, the degree of interference between the valve cover 20 and the valve seat 24 is higher at the marginal portions 66, 66 of the valve cover than at the mid-portion 68 of the valve cover. As can be seen, in the normally closed position, the valve cover 20 and valve seat 24 form a hermetic seal at the seam 36. In the illustrated embodiment, in the normally closed position, the hermetic seal substantially prevents the ingress of bacteria or germs in the direction from the outlet to the inlet.

In the illustrated embodiment, the flexible valve cover 20 is formed of an elastomeric material that exhibits substantially zero creep. In one currently preferred embodiment, the elastomeric material is a silicone. In another currently preferred embodiment, the elastomeric material includes an antimicrobial additive to further prevent any bacteria, germs or other microbial substances from entering the seam 36 of the valve or otherwise collecting on the dispensing tip of the valve. In another currently preferred embodiment, the elastomeric material is a silicone elastomer including a silver-based or other antimicrobial additive. Exemplary silicone elastomeric compounds for forming the valve cover and/or other features formed integral with the valve cover, including the actuator and sealing member, include any of numerous different liquid silicone rubbers, such as any of the liquid silicon rubbers sold by General Electric Company and/or Momentive Performance Materials under the LIM® trademark, including LIM 8040, or other liquid silicone rubbers, silicones or silicone-based elastomers, such as the antimicrobial elastomers sold by General Electric Company and/or Momentive Performance Materials under the StatSil™ trademark.

Figure 4:
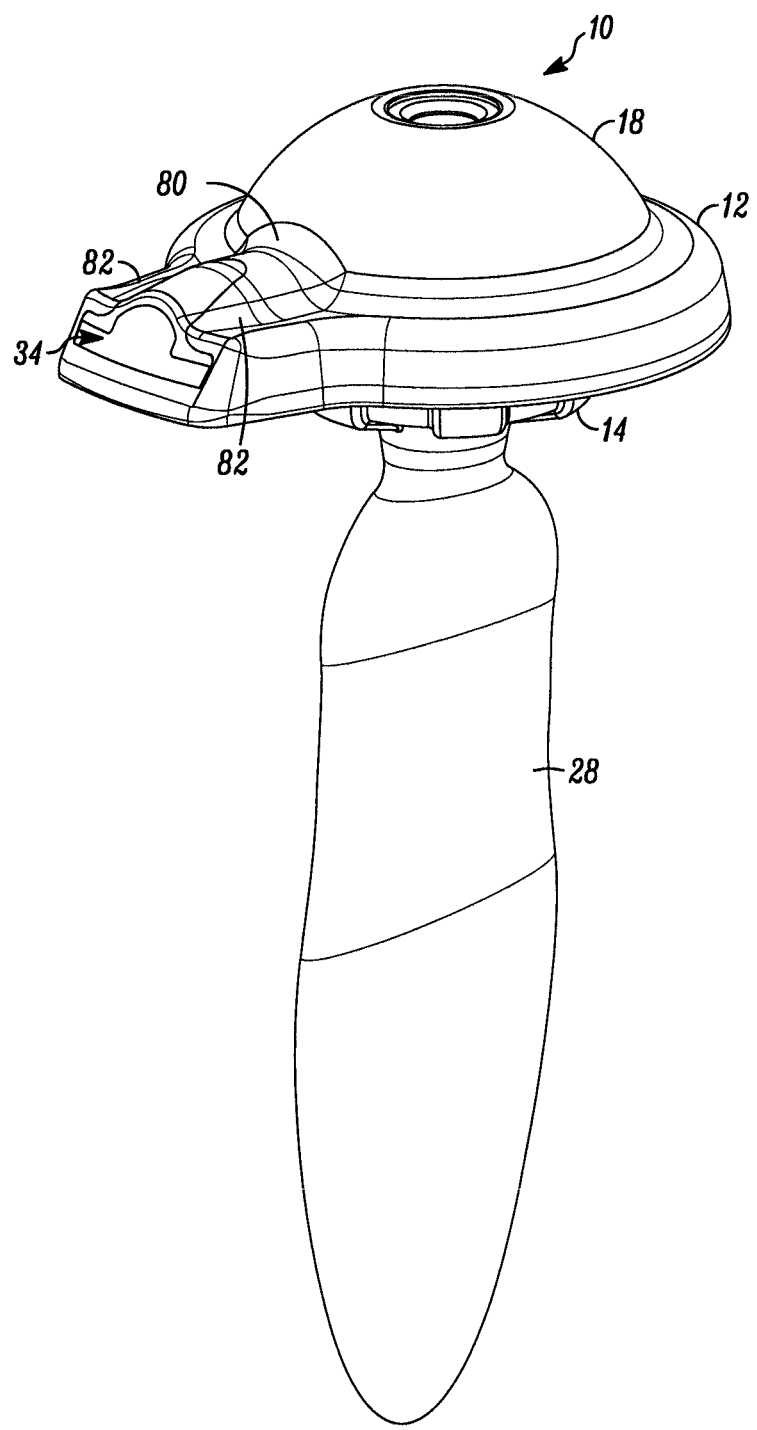
FIG. 4 is a perspective view illustrating the assembled closure, including the integral one-way valve and dome-spring actuator, and collapsed flexible pouch assembly, prior to sterile filling.

As can be seen, in the currently preferred embodiments, the valve cover 20 defines a substantially uniform thickness substantially throughout the mid-portion 68 thereof and substantially throughout the marginal portions 66 thereof. The mid-portion 68 of the valve cover 20 is substantially in tension between the opposing marginal portions 66, 66 thereof. As shown in FIG. 10, the second support 22 defines a plurality of relatively sharp protuberances 78 that engage the undersides of the marginal portions 66, 66 of the valve cover 20 to fixedly secure the valve cover relative to the valve seat. As shown typically in FIG. 4, the first support 16 overlies the base and marginal portions of the valve cover to compress these portions of the valve cover against the valve seat and/or second support 22, and thereby fixedly secure the valve cover to the valve seat and form the one-way valve. As shown in FIG. 4, the first support 16 defines an arcuate shaped base clamping surface 80 and opposing marginal portion clamping surface 82 that extend axially along the marginal portions of the valve cover, and extend progressively radially outwardly from the mid-portion of the valve cover when moving in the direction from the inlet toward the outlet of the valve.

Figure 2:
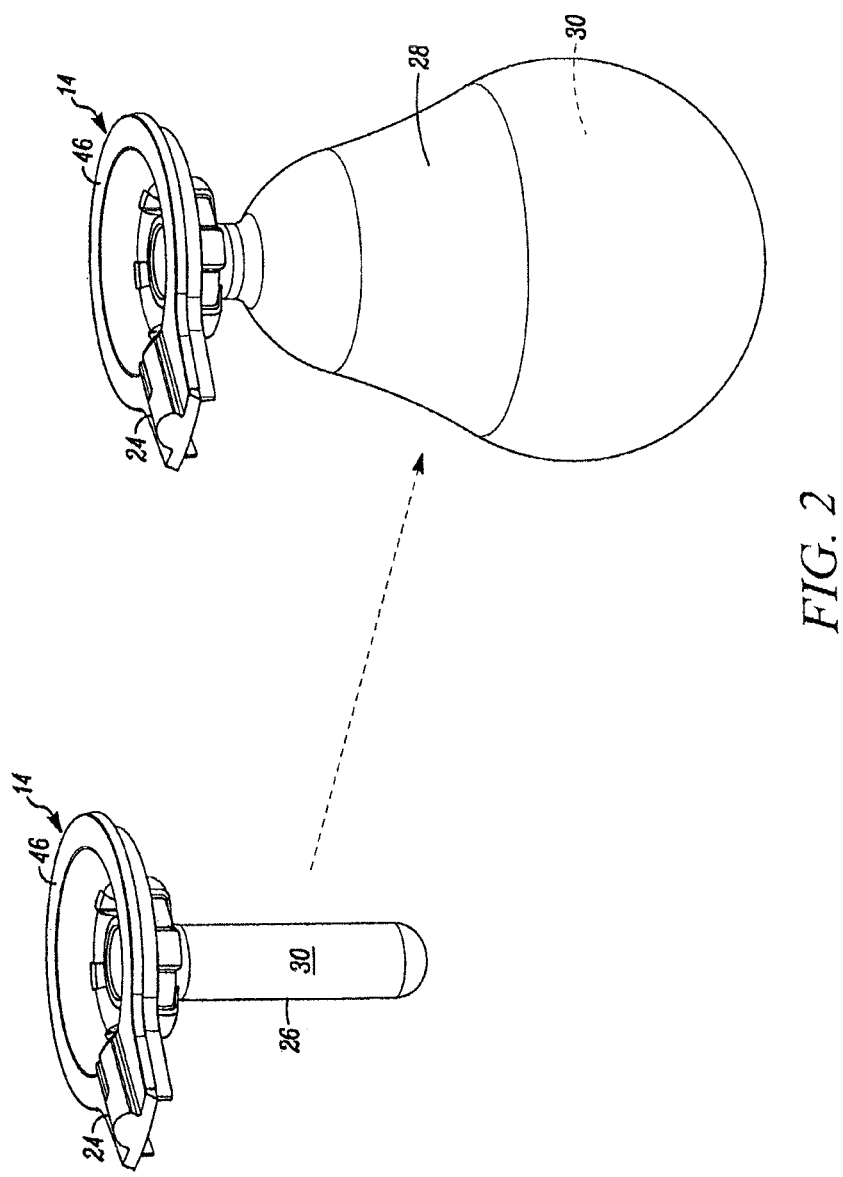
FIG. 2 illustrates sequential perspective views of the base of FIG. 1 including the injection molded variable-volume storage chamber pre-form, and showing the manner in which the injection molded pre-form is blow molded into a flexible pouch forming the variable-volume storage chamber.

As shown typically in FIG. 2, the second piece 14 includes an injection molded pre-form 26, and the variable-volume storage chamber 30 is defined by a flexible pouch 28 blow molded from the injection molded pre-form 26. A significant advantage of this feature is that the variable-volume storage chamber, valve seat, and part of the compression chamber, can be formed in one part as the second piece. Yet another advantage is that the valve seat and second support can be injection molded and formed to relatively tight tolerances, whereas the pre-form can be blow molded into the flexible pouch forming the variable-volume storage chamber while nevertheless maintaining the relatively tight tolerances of the other features of the second piece requiring such tolerances. As indicated in FIG. 2, after the second piece 14 is injection molded, the pre-form 26 is preheated and then stretch blow molded to form the pouch 28 in a manner known to those of ordinary skill in the pertinent art. In the illustrated embodiment, the second piece 14 and thus the pre-form 26 is made of PET or PP (polypropylene). However, as may be recognized by those of ordinary skill in the pertinent art based on the teachings herein, these components may be made of any of numerous different materials, and may define any of numerous different layers of material(s), or combinations of different materials forming the different features of the second piece, that are currently known, or that later become known. For example, the second piece, or the pre-form thereof, may be defined by a multi-layered, or laminated material to provide the desired barrier properties and/or internal surfaces for contact with the product to be stored therein.

Figure 3:
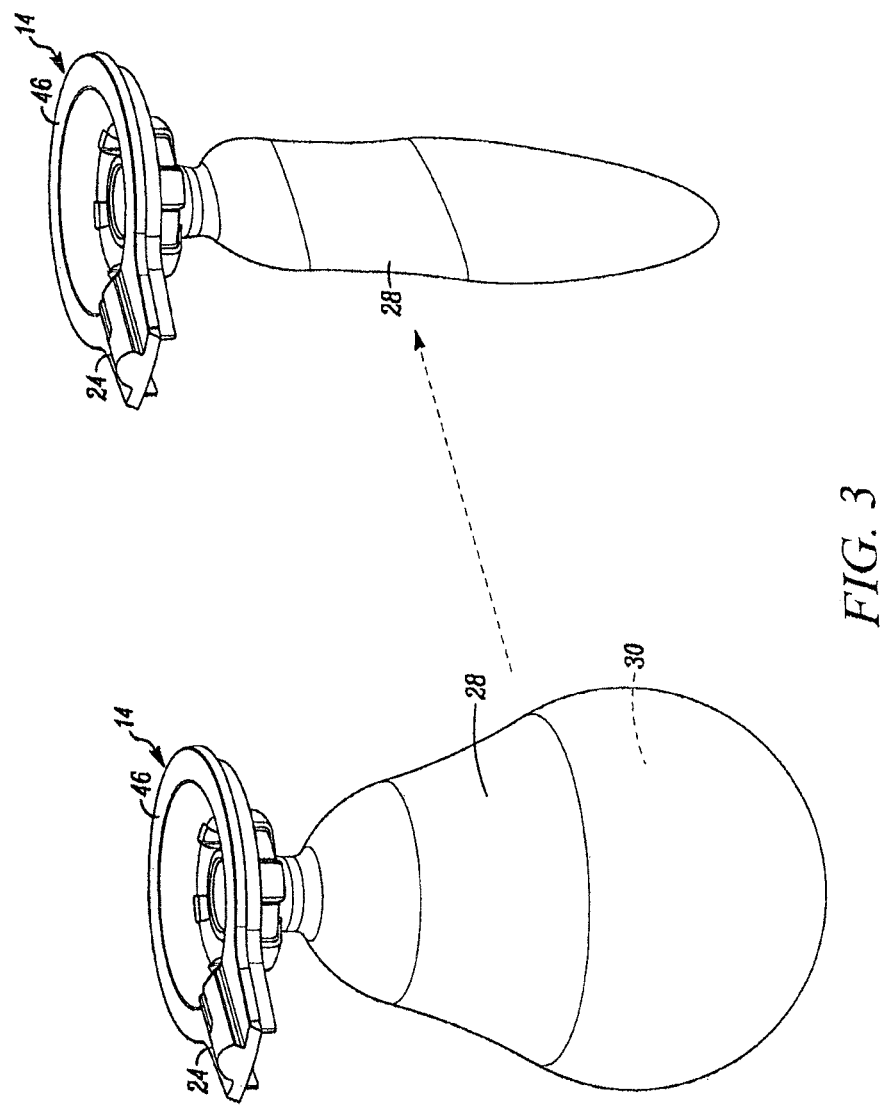
FIG. 3 illustrates sequential perspective views of the base of FIG. 1 showing the manner in which the flexible pouch is collapsed by applying vacuum thereto prior to sterile filling.

As shown in FIG. 3, after blow molding the pre-form into the pouch 28, the pouch is collapsed, such as by pulling a vacuum on the variable-volume storage chamber 30. Then, as shown in FIG. 4, the first piece 12, which defines a device closure, is assembled to the second piece 14 to hermetically seal the variable-volume storage chamber 30 and form the one-way valve 34. As indicated above, the first piece or closure 12 is assembled to the second piece 14 by snap fitting the two parts at the peripheral flange 52 and annular groove or recess 48. After assembly of the first and second pieces 12 and 14, respectively, the sealed empty device is sterilized. In the illustrated embodiment, the device is sterilized by subjecting it to irradiation, such as ebeam or gamma radiation. However, as may be recognized by those of ordinary skill in the pertinent art based on the teachings herein, any of numerous different methods or apparatus for sterilizing the device and/or the internal surfaces and cavities thereof, that are currently known, or that later become known, equally may be employed.

Figure 5:
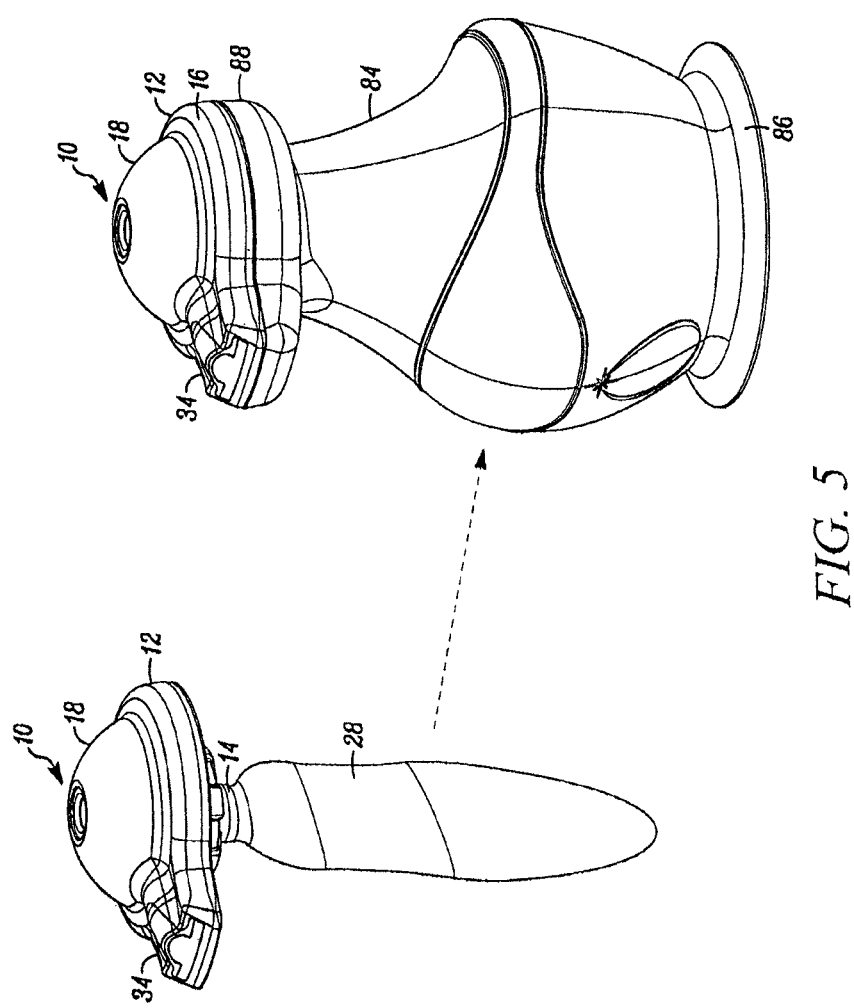
FIG. 5 illustrates sequential perspective views of the sterilized closure and collapsed pouch assembly, and showing insertion of the sterilized assembly into a container housing prior to sterile filling.

As shown in FIG. 5, the device 10 further includes a relatively rigid, hollow body or housing 84. The flexible pouch 28 is received within the hollow body 84, and the first support 16 is fixedly secured to the body. The housing 84 includes a base 86, which in the illustrated embodiment is flared, to support the device on a surface, and an upper support 88 that is secured to the first support 16 of the closure to attach the housing to the closure. As shown in FIG. 1, the second support 22 defines a depending, substantially annular flange 90 and a substantially annular recess 92 extending radially between the annular flange and the chamfer 50 of the first support 16. As shown in FIG. 7, the upper support 88 of the housing defines an upwardly extending, substantially annular flange 94 that is received within the annular recess 92 to secure the housing to the assembled first and second supports 16 and 22, respectively. In the illustrated embodiment, the annular flange 94 is press fit within the annular recess 92; however, as may be recognized by those of ordinary skill in the pertinent art based on the teachings herein, the flange 94 or housing 84 can be secured to the closure or first and/or second supports in any of numerous different ways that are currently known, or that later become known.

Figure 6:
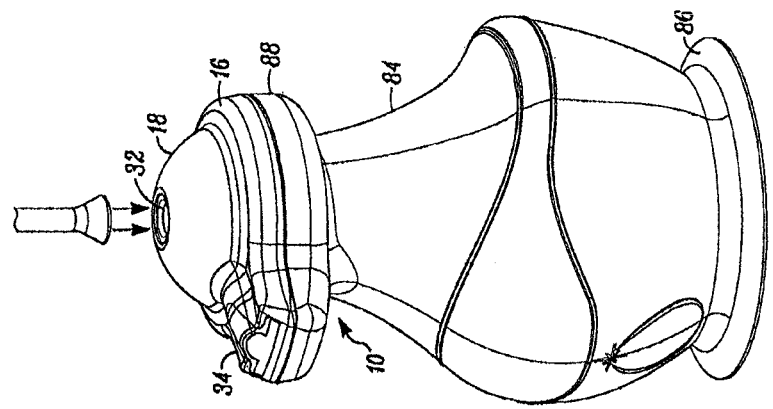
FIG. 6 illustrates sequential perspective views of the assembled dispenser undergoing surface sterilization with a fluid sterilant, such as vaporized hydrogen peroxide ("VHP"), and evaporation thereof with heated filtered air prior to sterile filling.
Figure 6:
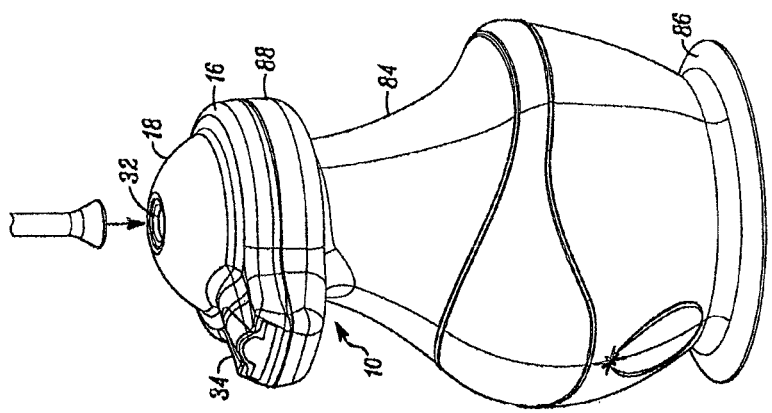

As shown in FIG. 6, the sealed, empty, sterilized device is then readied for sterile or aseptic filling by sterilizing again the penetrable region of the device (e.g., in case such surfaces are contaminated during transport or assembly post sterilization of the device). First, a fluid sterilant, such as vaporized hydrogen peroxide, is applied to the penetrable surface of the recess 32 of the actuator 18 to re-sterilize such surface(s). Second, a heated filtered gas, such as air, is applied to the fluid-sterilant receiving surface(s) to further evaporate such sterilant and provide a dry, sterilized, penetrable surface.

Figure 7:
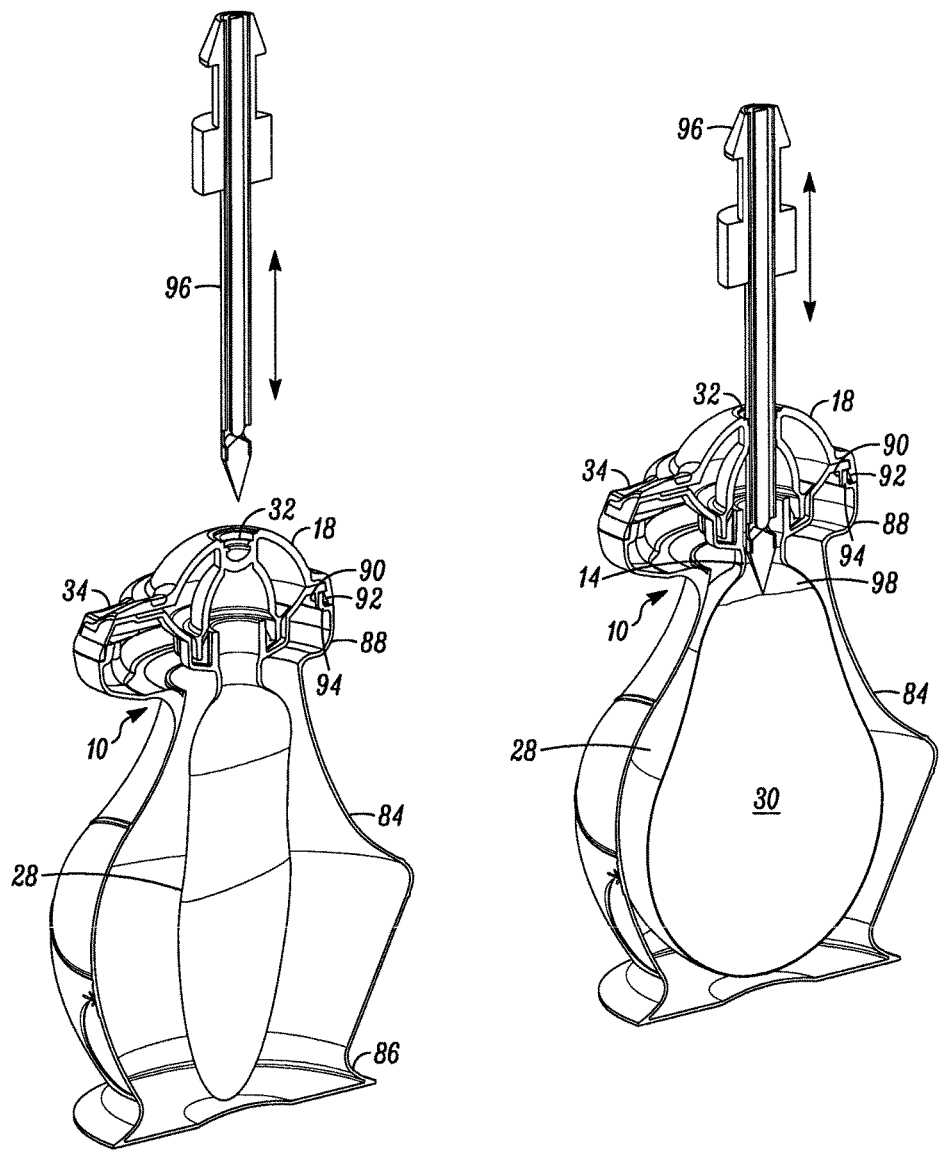
FIG. 7 illustrates sequential perspective, cross-sectional views of the assembled dispenser undergoing sterile needle filling of the variable-volume storage chamber.

As shown in FIG. 7, the sealed, empty sterile device is then sterile or aseptically filled by introducing an injection member, such as a needle 96, through the penetrable portion at the base of the recess 32, introducing a substance 98 through the injection member and into the variable-volume storage chamber 30, withdrawing the injection member from the penetrable portion, and resealing a resulting penetration aperture formed in the penetrable portion. One advantage of collapsing the pouch 28 prior to filling is that there is very little, and preferably substantially no air in the variable-volume storage chamber 30 prior to filling, thus preventing or substantially preventing the formation of foam during filling of a liquid substance 98 into the variable-volume chamber. This can be a significant advantage with respect to increasing filling speeds, particularly with liquid substances that have a tendency to foam during filling, such as with liquid foods and beverages, such as milks or milk-based products, and other liquid products. Accordingly, the device and method of the present invention can provide significantly increased filling speeds in comparison to the prior art.

Figure 8:
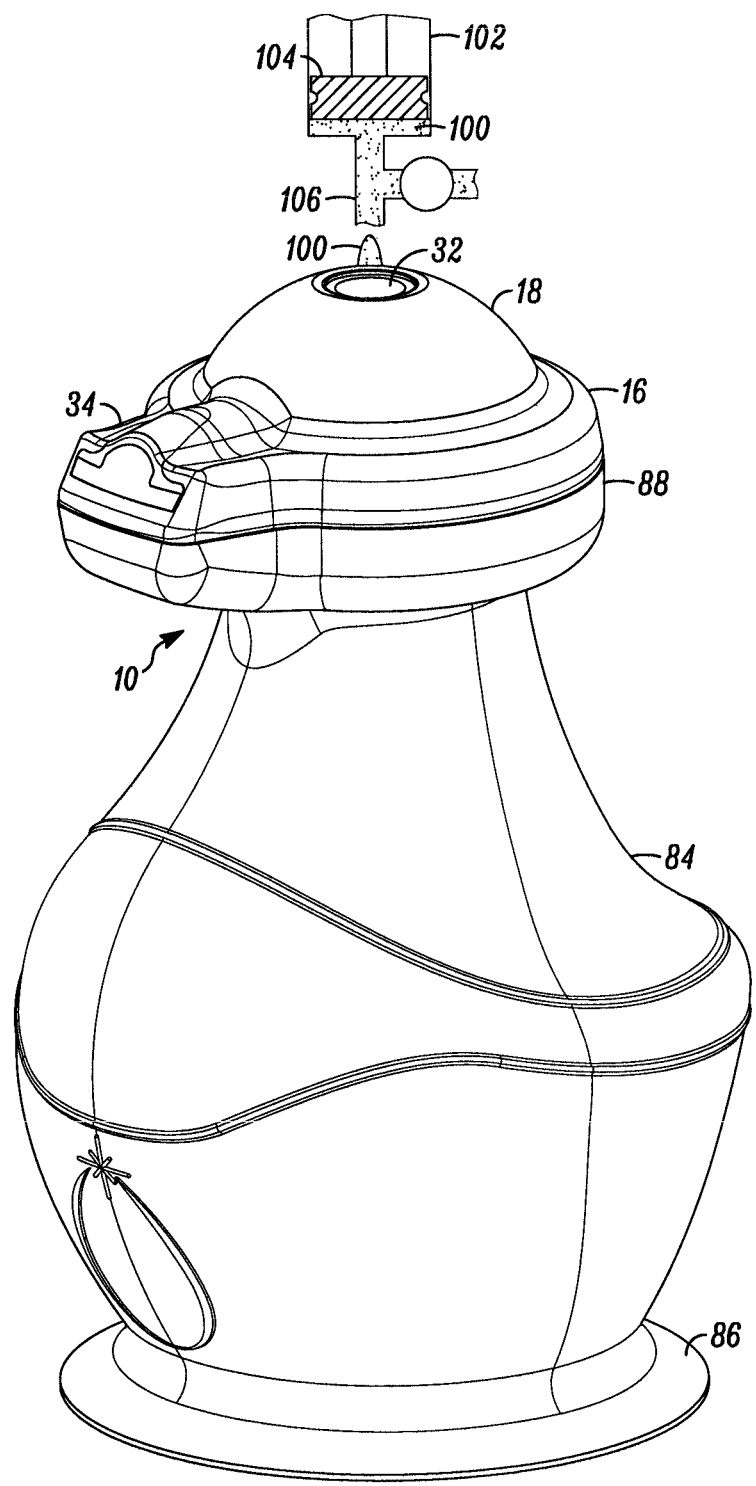
FIG. 8 is a perspective view illustrating resealing of the resultant penetration aperture with a liquid sealant, such as a room temperature vulcanizing silicone sealant, to hermetically reseal the closure and sterile product within the variable-volume storage chamber.
Figure 9:
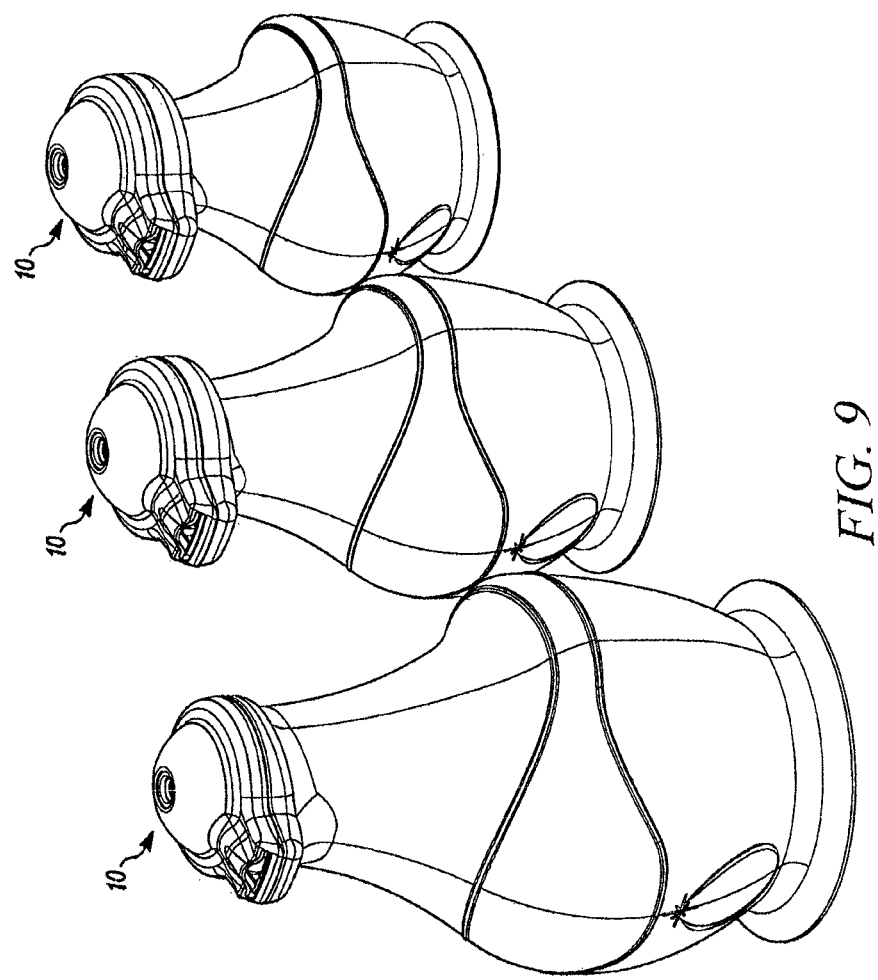
FIG. 9 illustrates perspective views of a family of dispensers embodying the present invention in different sizes.

In the illustrated embodiment, and as shown in FIG. 8, the resealing step includes applying a liquid sealant 100 to the resulting penetration aperture formed in the recess 32 and hermetically resealing the penetrable portion with the liquid sealant. In the illustrated embodiment, the liquid sealant is applied at approximately ambient temperature. In the currently preferred embodiment, the liquid sealant is a silicone. However, as may be recognized by those of ordinary skill in the pertinent art based on the teachings herein, the liquid sealant can take the form of any of numerous different sealants that are currently known, or that later become known. As can be seen, a resealing device 102 is mounted over the devices to be resealed after needle filling. The resealing device 102 includes a source of liquid sealant 100, or is coupled in fluid communication with a source of liquid sealant, and a pump 104 for pumping metered amounts of the liquid sealant onto the penetrated regions of the devices to hermetically reseal the penetration apertures, and thus hermetically seal the aseptically filled product within the variable-volume storage chamber 30. The pump 104 may take the form of a piston-type pump as shown, or may take the form of any of numerous other mechanisms for metering volumes or other measured amounts of liquid sealant onto the penetration apertures of the devices to seal the apertures, that are currently known, or that later become known, such as systems with pressurized liquid sealant and valves for releasing the pressurized sealant. The resealing device 102 may be fixedly mounted over a motorized conveyor for transporting the devices 10, or may be movable relative to the devices, to align a dispensing port 106 of the device with the penetration aperture(s). An overpressure of sterile filtered air of other gas may be supplied into a chamber or barrier enclosure containing the needle(s) and liquid resealing device(s) to further prevent contamination of devices during the needle filling and liquid resealing process. If desired, the system may include a plurality of needles mounted on a manifold that is driven vertically, or on which the needles are driven vertically, into and out of engagement with the penetrable portions of the devices, and a plurality of liquid resealing devices mounted adjacent to, or downstream of, the needles for liquid resealing the penetration apertures.

In an alternative embodiment, rather than sterile filling the device with a needle or other injection member, and resealing the resulting penetration aperture, the device may include a second filling valve formed integral and co-molded with the dispensing valve to allow sterile filling of the variable-volume storage chamber through the filling valve. In this alternative embodiment, the second support of the closure includes co-molded therewith a first integral flexible valve cover and a second integral flexible valve cover. The first support includes a first valve seat and a second valve seat. The first valve cover is superimposed on the first valve seat and forms a first dispensing valve defining a first axially-extending, normally closed dispensing valve seam, and the second valve cover is superimposed on the second valve seat and forms a second filling valve defining a second axially-extending, normally closed filling valve seam. The first support at least partially defines the compression chamber connectible in fluid communication between the variable-volume storage chamber and the inlet to the first dispensing valve seam, and the second support defines an actuator movable between first and second positions for pressurizing fluid within the compression chamber above the valve opening pressure and, in turn, dispensing the pressurized fluid through the dispensing valve. The dome-shaped or other flexible actuator is formed integral and co-molded with the first and second valve covers.

In the method of forming the device of this alternative embodiment, the step of molding the closure includes co-molding the second support with the first integral flexible valve cover and the second integral flexible valve cover. The step of injection molding the support includes injection molding the support with the first integral valve seat and the second integral valve seat. The step of assembling the closure to the support includes (i) superimposing the first valve cover on the first valve seat and forming the first dispensing valve defining the first axially-extending, normally closed valve seam, and (ii) superimposing the second valve cover on the second valve seat and forming the second filling valve defining the second axially-extending, normally closed valve seam. After the sterilizing step, a filling member, such as a hollow cannula coupled in fluid communication with a pump or pressurized source of product to be sterile filled, is placed in fluid communication with the normally closed valve seam of the second filling valve. Then, the substance is sterile filled through the filling member and into the second normally closed valve seam at a pressure at or above a valve opening pressure of the second normally closed valve seam and into the variable-volume storage chamber. After the variable-volume storage chamber is sterile filled with the substance, the filling member is withdrawn from the second valve. The sterile filled substance is maintained hermetically sealed within the variable-volume storage chamber throughout a shelf life and between multiple doses of substance from the variable-volume storage chamber through the first dispensing valve.

One advantage of the device and method of the present invention is that the device may be manufactured in essentially two parts forming a sealed, empty, sterile variable-volume storage chamber that is ready for aseptic filling by needle penetration and resealing by liquid sealant or by any of numerous other sterile filling methods or devices that are currently known, or that later become known. Yet another advantage is that the housing or outer body may be formed of a relatively inexpensive material, such as recycled plastic, cardboard, or other biodegradable materials, that after use may be automatically disassembled into (1) the collapsed plastic bag and closure that can be recycled, and (2) the outer bottle or body which can be biodegradable. Alternatively, the housing can be reusable such that the collapsed pouch and closure can be removed from the housing, and a fresh pouch and enclosure can be inserted into the housing as many times as desired.

A significant advantage of the currently preferred embodiments is that the following features are provided in only two parts: zero possible ingress in a multi-dose delivery system; a non-contamination valve; a sterile filling port; a metering dose pump; a collapsible pouch defining a sealed, variable-volume storage chamber; and a compression chamber in fluid communication between the variable-volume storage chamber and the non-contamination valve and forming part of the metering dose pump. Yet another advantage of the currently preferred embodiments is that they provide the possibility to stay with a two piece collapsible assembly or to add a more rigid container that is completely bio-degradable, re-usable and/or recyclable. A still further advantage is that the unique valve prevents any ingress of any germs, bacteria or other unwanted substances, and thus prevents contamination of the product stored within the interior of the device which, in turn, may significantly increase the stability of the product. A still further advantage is that there is no need to refrigerate the container or other device, even after multiple dose delivery, since the variable-volume storage chamber remains hermetically sealed and each dose is sterile from the first to the last. Another advantage of the currently preferred embodiments is that the package provides a unique means to reduce the carbon foot print of the packaging in comparison to prior art packages. For example, there is no need to re-heat the product after filling (such as with retort processing), and there is no need to refrigerate the product or container after dispensing or between dispensing multiple doses over extended periods of time. Yet another advantage of the currently preferred embodiments is that they can provide a high, and even unmatched, safety level assurance in a very price competitive package.

As may be recognized by those of ordinary skill in the pertinent art based on the teachings herein, numerous changes may be made to the above-described and other embodiments of the present invention without departing from the scope of the invention. For example, the device may be sterile filled in any of numerous different ways, including by needle penetration and laser resealing, or valve-in filling. The actuator, one-way valve, housing and other components of the device may be formed of any of numerous different materials or combinations of materials, may take any of numerous different shapes and/or configurations, and may be manufactured in accordance with any of numerous different methods or techniques, that are currently known or that later become known. In addition, the devices may include few or more components or features than the embodiments described herein. Further, the variable-volume storage chamber may be formed of any of numerous different materials or configurations, in accordance with any of numerous different manufacturing techniques, that are currently known or that later become known. In addition, the term "semi-annular" is used herein to mean a portion of, or less than 360° of a surface, but does not require that the surface be circular or defined by a portion of a circle. Rather, the semi-annular surface may be curvilinear in part and/or substantially flat in part. Accordingly, this detailed description of currently preferred embodiments is to be taken in an illustrative as opposed to limiting sense.

What is claimed is:

1. A method, comprising:
    filling a device with a substance, the device including a first piece comprising a penetrable portion and a first surface and a second piece defining a chamber for containing substance therein and comprising a second surface, said first piece securedly attached to the second piece and at least a portion of the first surface in sealing engagement with at least a portion of the second surface to define a seal therebetween to seal the chamber from ambient atmosphere, the sealed chamber in fluid communication with the penetrable portion;
    wherein the filling step includes
        penetrating the penetrable portion with a filling or injection member;
        introducing substance through the filling or injection member and into the chamber;

withdrawing the filling or injection member from the penetrable portion; and subsequent to the withdrawing step, dispensing a liquid sealant from a resealing device including, or in fluid communication with, a source of the liquid sealant and onto the penetrable portion, so that liquid sealant dispensed from the resealing device contacts and overlies a resulting penetration aperture formed in the penetrable portion, and hermetically seals the penetration aperture.

2. A method as recited in claim 1, wherein the liquid sealant is at ambient temperature when dispensed.

3. A method as recited in claim 1, further comprising applying oxygen or other gas to the sealant to facilitate curing of the sealant.

4. A method as recited in claim 3, wherein the oxygen or other gas is applied at a substantially predetermined temperature for curing the sealant.

5. A method as recited in claim 1, wherein the dispensing step includes overlying the sealant in a recess defined by the penetrable portion.

6. A method as recited in claim 1, wherein the sealant is a silicone.

7. A method as defined in claim 1, wherein the sealed chamber is sterile and the introducing step includes aseptically introducing substance through (he filling or injection member and into the chamber.

8. A method as defined in claim 1, wherein the dispensing step includes pumping liquid sealant with a pump out of the resealing device.

9. A method as defined in claim 1, wherein the dispensing step includes dispensing a metered or measured volume or amount of liquid sealant.

10. A method as defined in claim 1, wherein the resealing device comprises a dispensing port and the dispensing step includes dispensing the liquid sealant from the dispensing port.

11. A method as defined in claim 10, further comprising aligning the dispensing port with the penetration aperture.

12. A method as defined in claim 1, further comprising mounting the resealing device over the device.

13. A method as defined in claim 1, wherein the penetrable portion contains a recess, and the dispensing step includes dispensing the liquid sealant into the recess.

14. A method as defined in claim 1, wherein the penetrable portion is defined by a portion of the first piece made of an elastomeric material.

15. A method as defined in claim 1, wherein the first piece is formed with a first material and the second piece is formed with a second material that is different than the first material.

16. A method as defined in claim 1, wherein the device further includes a nozzle for dispensing substance.

* * * * *

UNITED STATES PATENT AND TRADEMARK OFFICE
CERTIFICATE OF CORRECTION

PATENT NO. : 10,131,474 B2  
APPLICATION NO. : 14/680393  
DATED : November 20, 2018  
INVENTOR(S) : Daniel Py Page 1 of 1

It is certified that error appears in the above-identified patent and that said Letters Patent is hereby corrected as shown below:

In the Claims

Claim 7, Column 15, Line 26, "(he" should be replaced with --the--.

Signed and Sealed this  
Nineteenth Day of February, 2019

Andrei Iancu  
*Director of the United States Patent and Trademark Office*